US010775573B1

(12) United States Patent
Hsu et al.

(10) Patent No.: US 10,775,573 B1
(45) Date of Patent: Sep. 15, 2020

(54) EMBEDDING MIRROR WITH METAL PARTICLE COATING

(71) Applicant: INTERNATIONAL BUSINESS MACHINES CORPORATION, Armonk, NY (US)

(72) Inventors: Hsiang Han Hsu, Kanagawa (JP); Masao Tokunari, Kanagawa (JP); Koji Masuda, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/374,152

(22) Filed: Apr. 3, 2019

(51) Int. Cl.
G02B 6/42 (2006.01)
G02B 6/43 (2006.01)
G02B 6/122 (2006.01)
G02B 6/12 (2006.01)

(52) U.S. Cl.
CPC ............ G02B 6/4214 (2013.01); G02B 6/43 (2013.01); G02B 6/1221 (2013.01); G02B 6/1228 (2013.01); G02B 2006/12104 (2013.01)

(58) Field of Classification Search
None
See application file for complete search history.

(56) References Cited

U.S. PATENT DOCUMENTS

| | | | | |
|---|---|---|---|---|
| 7,599,277 B1* | 10/2009 | Kato | ..................... | G11B 7/124 369/112.09 |
| 2006/0204196 A1* | 9/2006 | Naitou | ................... | G02B 6/125 385/129 |
| 2009/0269704 A1* | 10/2009 | Hodono | .................. | G02B 6/13 430/319 |
| 2016/0334572 A1 | 11/2016 | Kraft et al. | | |
| 2018/0240945 A1 | 8/2018 | Tischler et al. | | |
| 2018/0299607 A1 | 10/2018 | Menezes et al. | | |

OTHER PUBLICATIONS

Stetsenko, M. O., et al. "Optical properties of gold nanoparticle assemblies on a glass surface," Nanoscale research letters, Dec. 2017, 10 pages, 12.1.

* cited by examiner

Primary Examiner — Jerry Rahll
(74) Attorney, Agent, or Firm — Tutunjian & Bitetto, P.C.; Vazken Alexanian

(57) ABSTRACT

A method for forming an embedded mirror structure is disclosed. The method includes preparing a structure that has a substrate and a waveguide layer on the substrate. The waveguide layer includes a core. Also, the waveguide has a top surface and a cavity side surface that defines a cavity opened at the top surface and aligned to the core. The method further includes coating metal particles on the cavity side surface inside the cavity of the waveguide layer to form a metal particle film on the cavity side surface.

20 Claims, 9 Drawing Sheets

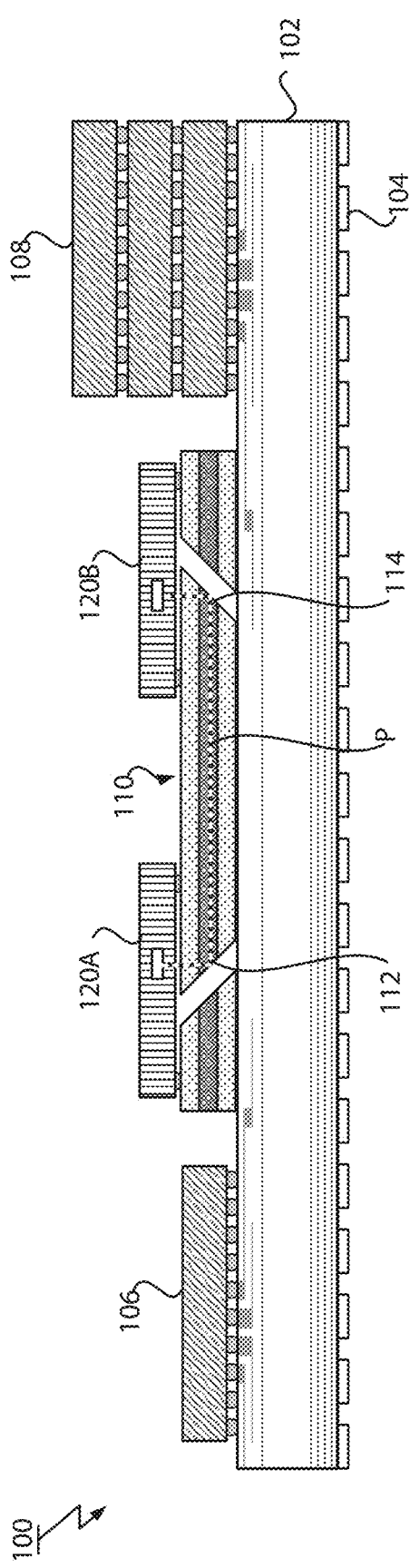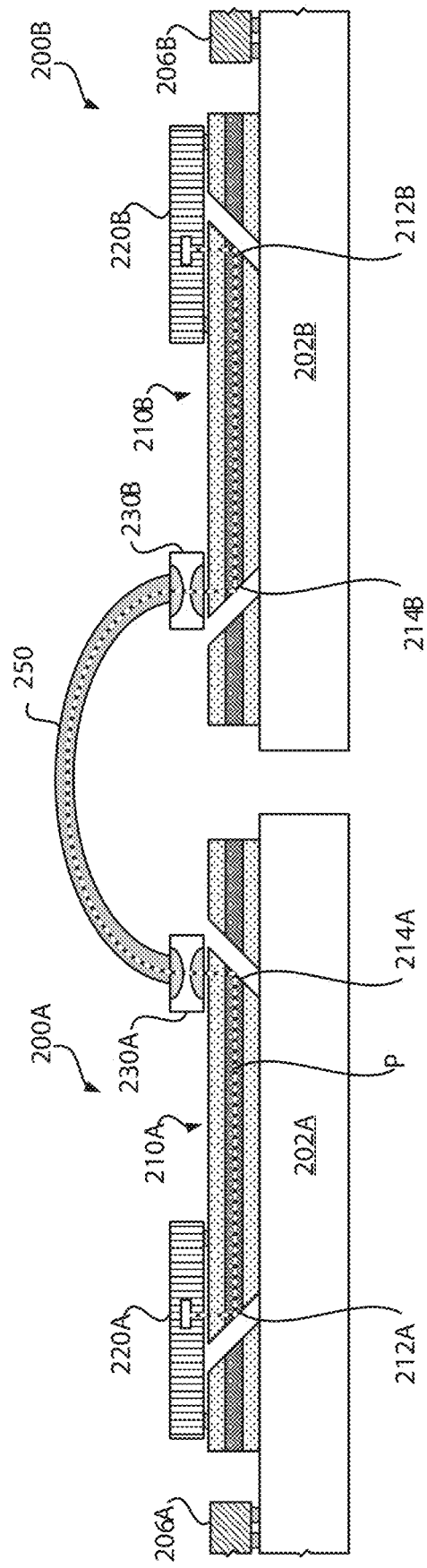
FIG. 1A
FIG. 1B

EMBEDDING MIRROR WITH METAL PARTICLE COATING

BACKGROUND

The present disclosure, generally, relates to an embedding of mirror, more particularly, to a method for forming an embedded mirror structure, an embedded mirror structure, a device including thereof, a waveguide integrated board including thereof, and a fabrication method for fabricating a device including thereof.

In recent years, demand for reduction of transmission loss and higher density in optical interconnects is increasing. Waveguide integrated substrates have attracted attention as a promising solution for short distance optical interconnects. In such waveguide integrated substrates, a mirror for redirecting light from/to the waveguide to/from an optical element such as a VCSEL (Vertical Cavity Surface Emitting Laser) or a PD (Photo-Diode) is one of the key components that can affect the overall performance. However, it is not easy to make the mirror in the waveguide structure. Furthermore, the mirror is at risk of being destroyed during subsequent formation of an interconnection between the waveguide and the optical element.

There is a need for a technique capable of efficiently fabricating an embedded mirror structure with higher accuracy that has resistance to malfunction during subsequent formation of an optical interconnect.

SUMMARY

According to an embodiment of the present invention, a method for forming an embedded mirror structure is provided. The method includes preparing a structure having a substrate and a waveguide layer on the substrate. The waveguide layer includes a core and has a top surface and a cavity side surface defining a cavity that is opened at the top surface and aligned to the core. The method further includes coating metal particles on the cavity side surface inside the cavity of the waveguide layer to form a metal particle film on the cavity side surface.

According to other embodiment of the present invention, an embedded mirror structure including a substrate and a waveguide layer on the substrate is provided. In the embedded mirror structure, the waveguide layer includes a core and has a top surface and a cavity side surface defining a cavity that is opened at the top surface and aligned to the core. The embedded mirror structure further includes a metal particle film formed on the cavity side surface of the waveguide layer. The metal particle film includes metal particles coated on the cavity side surface.

According to another embodiment of the present invention, a fabrication method for fabricating a device is provided. The fabrication method includes preparing an embedded mirror structure. The embedded mirror structure includes a substrate and a waveguide layer on the substrate. The waveguide layer includes a core and has a top surface and a cavity side surface defining a cavity that is opened at the top surface and aligned to the core. The embedded mirror structure further includes a metal particle film formed on the cavity side surface of the waveguide layer. The metal particle film includes metal particles coated on the cavity side surface. The fabrication method includes mounting an optical or optoelectronic component onto the embedded mirror structure so that the optical or optoelectronic component is optically coupled to the waveguide layer of the embedded mirror structure.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings. Note that the sizes and relative positions of elements and layers in the drawings are not necessarily drawn to scale. Some of these elements or layers are arbitrarily enlarged and positioned for improving legibility of drawing.

FIGS. 1A and 1B illustrate cross-sectional views of an on-board optical interconnection system and a board-to-board optical interconnection system according to one or more particular embodiments of the present invention.

DETAILED DESCRIPTION

Figure 2A:
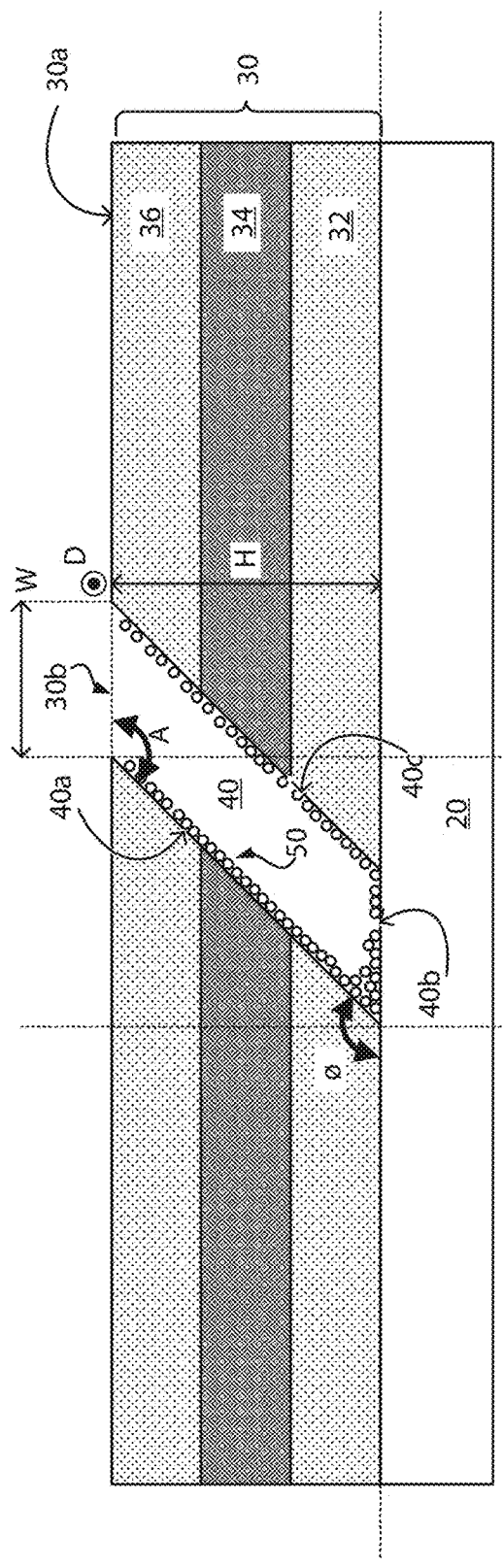
FIGS. 2A and 2B illustrates a cross-sectional view and a top view of an embedded mirror structure according to an exemplary embodiment of the present invention.

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to an embedded mirror structure, a device including the embedded mirror structure and a waveguide integrated board including the embedded mirror structure, in which the embedded mirror structure is fabricated into a cavity formed in an optical waveguide (hereinafter, simply referred to as waveguide) layer and aligned to a core of the waveguide layer, and an interface between the core and air in the cavity works as a mirror with a metal particle film provided thereto. One or more other embodiments according to the present invention are directed to a method for forming the embedded mirror structure and a fabrication method for fabricating a device including the embedded mirror structure.

Hereinafter, with reference to a series of FIGS. 1A and 1B and FIGS. 2A and 2B, an embedded mirror structure, a device including the embedded mirror structure, and a waveguide integrated board including the embedded mirror structure according to one or more exemplary embodiments of the present invention will be described.

Referring to FIG. 1A, an on-board optical interconnection system 100 according to a particular embodiment of the present invention is described. FIG. 1A shows a cross-sectional view of the on-board optical interconnection system 100. The on-board optical interconnection system 100 corresponds to the device that includes the embedded mirror structure according to the particular embodiment of the present invention.

As shown in FIG. 1A, the on-board optical interconnection system 100 can include an organic substrate 102; a semiconductor chip 106 mounted on the organic substrate 102; and stacked semiconductor chips 108 mounted on the organic substrate 102. The on-board optical interconnection system 100 according to the particular embodiment of the present invention further includes a polymer waveguide layer 110 formed on a front side of the organic substrate 102; and a plurality of optoelectronic chips 120A, 120B optically coupled to the polymer waveguide layer 110. The on-board optical interconnection system 100 can also have electrodes 104 formed at a back side thereof and can be mounted on a motherboard through the electrodes 104 of the organic substrate 102.

The organic substrate 102 is a substrate made of organic material. The organic substrate 102 can include a wiring, to which mounted components such as the semiconductor chip 106, stacked semiconductor chips 108 and the optoelectronic chips 120 are electrically connected. The organic substrate 102 can be a PCB (Printed circuit board). The semiconductor chip 106 and the stacked semiconductor chips 108 can be any device, which includes a processor (CPU (Central Processing Unit)), a memory (SRAM (Static Random Access Memory), HBM (High Bandwidth Memory), ASIC (Application-Specific Integrated Circuit), FPGA (Field Programmable Gate Array), to name but a few.

The polymer waveguide layer 110 guides a light for optical signal transmission. The optoelectronic chip 120 can include an optic such as lens, an optoelectronic device such as VCSEL (Vertical Cavity Surface Emitting Laser), a PD (Photo-Diode), LED (Light Emitting Device) and/or an electronic component such as LDD (Laser Diode Driver), TIA (Trans-Impedance Amplifier), etc. In a particular embodiment, one of the optoelectronic chips 120A, 120B works as a transmitter and other of the optoelectronic chips 120A, 120B works as a receiver, and/or vice versa. The optoelectronic chips 120A, 120B communicate with each other through the polymer waveguide layer 110 as illustrated by a dash line P in FIG. 1A. In the on-board optical interconnection system 100, interconnections between the optoelectronic chips 120A 120B and the polymer waveguide layer 110 are achieved by TIR (Total Internal Reflection) mirrors 112, 114 embedded in the polymer waveguide layer 110.

Referring to FIG. 1B, a board-to-board optical interconnection system according to other particular embodiment of the present invention is described. FIG. 1B shows a cross-sectional view of the board-to-board optical interconnection system.

The board-to-board optical interconnection system can include two board 200A, 200B (also referenced 200). Each board 200 corresponds to the device including the embedded mirror structure according to this particular embodiment of the present invention. Each board 200 can include an organic substrate 202 (also referenced as 202A and 202B); and a semiconductor chip 206 (also referenced as 206A and 206B) mounted on the organic substrate 202. The board 200 further includes a polymer waveguide layer 210 (also referenced as 210A and 210B) formed on the organic substrate 202; an optoelectronic chip 220 (also referenced as 220A and 220B) and a vertical optical connector 230 (also referenced as 230A and 230B) optically coupled to the polymer waveguide layer 210. The board-to-board optical interconnection system includes further an optical fiber 250 that has one end coupled to the first vertical optical connector 230A of the first board 200A and other end coupled to the second vertical optical connector 230B of the second board 200B.

The optoelectronic chips 220A, 220B communicate with each other through the polymer waveguide layers 210A and 210B and the optical fiber 250 as illustrated by a dash line P in FIG. 1B. In each board 200 of the board-to-board optical interconnection system, interconnections between the optoelectronic chips 220 and the polymer waveguide layers 210 and between the vertical optical connectors 230 and the polymer waveguide layers 210 are achieved by TIR mirrors 212, 214 (also referenced as 212A, 212B, 214A and 214B) embedded in the polymer waveguide layers 210.

In such optical interconnection systems shown in FIGS. 1A and 1B, each of the TIR mirrors 112, 114, 212, 214 can be fabricated by forming a cavity in the polymer waveguide layer 110 or 210 at a location aligned to a core of the polymer waveguide layer 110 or 210. As illustrated in FIGS. 1A and 1B, the cavity is drilled obliquely into the polymer waveguide layer 110 or 210 so as to provide a core/air interface with a predetermined angle for redirecting light propagated from/to the core of the polymer waveguide layer 110 or 210, by 90°; for example.

The TIR mirrors provide strong light confinement effect at the interface between the air of the cavity and the core of the polymer waveguide layer. However, it is not easy to make such mirrors in the waveguide structure. Furthermore, such mirror structures are subject to being destroyed or malfunction during subsequent formation of an interconnection between the polymer waveguides and optical elements. For example, resin material such as underfill or sidefill material, which is used to fix a mounted component to the waveguide layer, can easily infiltrate the cavity, which will destroy the channel since the resin material penetrating into the mirror cavity reduces the difference in refractive indices between the cavity and the core such that TIR conditions are no longer satisfied at the interface.

In accordance with the exemplary embodiment of the present invention, in order to prevent the TIR mirror from being affected by the resin material penetrating into the cavity, metal material is provided to the interface between the air of the cavity and the core of the polymer waveguide layer, especially, prior to an underfill/sidefill dispense process. However, even though there are various methods for coating a metal material on a surface, including physical depositions such as sputtering, it is not easy to coat overhang surfaces with metal material after placing the polymer waveguide layer 110 on the organic substrate 102. Also, process conditions of high temperature are difficult to employ in the fabrication process (requiring 200 or less degrees Celsius) when the organic substrates 102, 202 are employed.

Figure 2B:
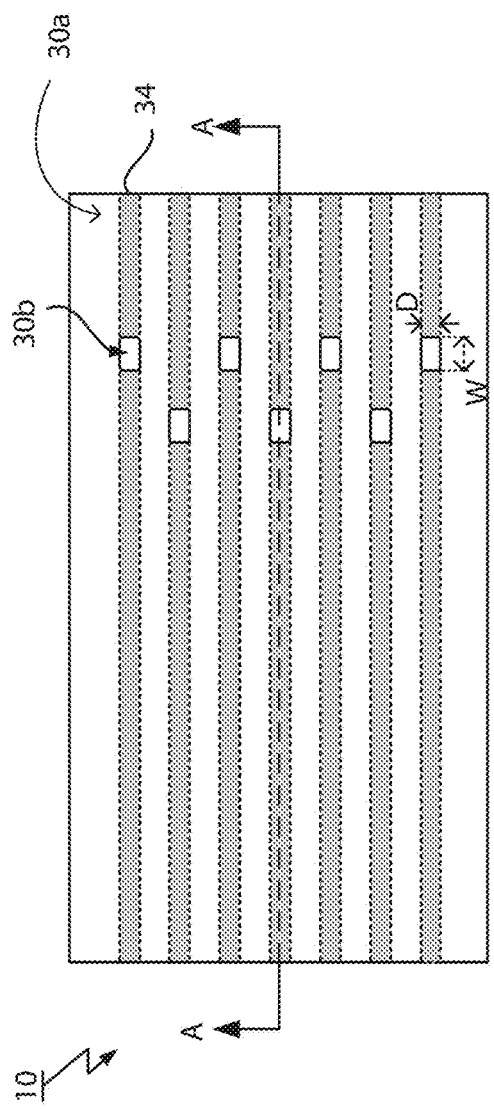

FIGS. 2A and 2B illustrates a cross-sectional view and a top view of an embedded mirror structure 10 according to the exemplary embodiment of the present invention. Note that the cross-sectional view shown in FIG. 2A corresponds to a cross-section indicated by "A" in the top view shown in FIG. 2B. Also note that the embedded mirror structure 10 shown in FIG. 2A can correspond to one of the TIR mirrors 112, 114 shown in FIG. 1A and the TIR mirrors 212A, 212B, 214A, 214B shown in FIG. 1B.

As shown in FIG. 2A, the embedded mirror structure 10 includes an organic substrate 20 and a polymer waveguide layer 30 formed on the organic substrate 20. The polymer waveguide layer 30 includes a lower cladding layer 32; a set of cores 34 formed on the lower cladding layer 32; and an upper cladding layer 36 enclosing the set of the cores 34.

As shown in FIG. 2B, the set of the cores 34 is arranged in a horizontal plane parallel to main surfaces of the polymer waveguide layer 30 and extends in one direction in the horizontal plane. Each core 34 forms a channel, through which an optical signal is transmitted. In the described embodiment, the set of the cores 34 is described to be arranged in only one layer between the lower and upper cladding layers 32, 36. However, in one or more other embodiments, a set of cores can be arranged over multiple layers, which are each sandwiched between their upper and lower cladding layers, resulting in a 2-dimensional array of cores.

The polymer waveguide layer 30 has a top surface 30*a*. As shown in FIG. 2A, a cavity 40 is drilled obliquely into the polymer waveguide layer 30 from the top surface 30*a* at a location aligned to the core 34 so as to provide a core/air interface for redirecting light propagated from/to the core 34 by a predetermined angle. In a particular embodiment, the core/air interface has an angle of 45° with respect to the horizontal plane G. The light propagated from the core 34 along with a core-extending direction is incident on the core/air interface and is redirected by 901. The light propagated from a direction perpendicular with respect to the core-extending direction is incident on the core/air interface, is redirected by 90° and heads toward the core 34.

As shown in FIG. 2B, there is an opening 30*b* aligned to each core 34 and the opening 30*b* corresponds to the cavity 40 opened at the top surface 30*a* and formed through the polymer waveguide layer 30 shown in FIG. 2A. As shown in FIG. 2B, the openings 30*b*, accordingly the cavities 40, are illustrated to be arranged in a form of a staggered array in the top surface 30*a*, in which the positions of the cavities 40 are shifted along with the core-extending direction alternatingly. By shifting the positions of the cavities 40 along with the core-extending direction, higher density fabrication of optical channels in the polymer waveguide layer 30 becomes possible. In FIG. 2B, the staggered array of the cavities 40 are exemplary illustrated. However, such layout of the cavities suitable for higher density fabrication may not be limited. An array of cavities aligned at an angle (e.g., 45°, 60°) with respect to the core-extending direction can also be contemplated. In these cases, an individual opening (and accordingly an individual cavity) is fabricated for each core 34 at each end one-by-one. However, the form of the array of the opening 30*b* is not limited to the staggered array and the like. In an exemplary case, an opening (and accordingly a cavity) can be fabricated for a plurality of cores at each end.

In a particular embodiment, the cavity 40 is fabricated obliquely from the top surface 30*a* to the bottom of the polymer waveguide layer 30. The polymer waveguide layer 30 has four cavity side surfaces 40*a*, 40*c* (other two side surfaces are not shown in the drawing) for each cavity 40. The top surface of the organic substrate 20 can provide a bottom surface 40*b* of the cavity 40.

The one cavity side surface 40*a* that provides the core/air interface for redirecting the light propagated from/to the core 34 of the polymer waveguide layer 30 is inclined with a predetermined slope angle $\theta$ that exceeds perpendicular V with respect to the horizontal plane G parallel to the top surface 30*a*. Thus, the cavity side surface 40*a* provides an over-hanged structure, which has a slope of more than 90°; e.g., beyond the vertical. In a particular embodiment, the slope angle $\theta$ is 135°. On the other hand, the opposite cavity side surface 40*c* of the one cavity side surface 40*a* is inclined with (180°-$\theta$) not exceeding perpendicular with respect to the horizontal plane G.

The cavity 40 has dimensions on sub-millimeter scale, more preferably micrometer scale. For example, in a particular embodiment, the width W of the cavity 40 can be 100 μm (micrometer), the height H can be 75 μm (micrometer) and the depth D can be 60 μm (micrometer). The cavity 40 can have approximately 450,000 cubic micrometers (μm$^3$). Accordingly, the mirror has also dimensions on sub-millimeter scale, more preferably micrometer scale.

The cavity 40 can be fabricated by laser ablation or other appropriate technique. By drilling the cavity 40 with the laser ablation, it is possible to make the cavity side surface 40*a* smooth, so laser ablation is preferable. In a particular process condition, the surface roughness of the cavity side surface 40*a*, 40*c* within a range where the loss is 0.5 dB or less is possible. Also, the shape of the opening 30*b* of the cavity 40 can be optimized for a process condition. For example, a rounded corner shaped cavity can be fabricated in order to prevent the mirror structure from being cracked during the fabrication process or the life cycle of the final product.

The embedded mirror structure 10 according to the exemplary embodiment of the present invention further includes a metal particle film 50 formed on the cavity side surface 40*a*, 40*c* and the bottom surface 40*b* of each cavity 40. The metal particle film 50 includes metal particles coated on the cavity side surface 40*a*, 40*c* and the bottom surface 40*b*.

The metal particles in the metal particle film 50 includes particles of metallic material. Such metallic material can include pure metals and metal alloys. In one or more embodiments, the metal is any one of a group consisting of noble metals such as silver (Ag) and gold (Au) and light metals such as aluminum (Al). In a preferable embodiment, the metal particles include noble metal particles.

In a particular embodiment, a wavelength in the infrared range such as 850 nm can be targeted. In a preferable embodiment, the metal particles have a diameter of nanometer scale, more preferably in a range of less than 200 nm, further more preferably in a range of less than 100 nm. The diameter of the metal particles is preferably small since extinction or optical density (OD) for such infrared range (e.g., 850 nm) increase as the size increases. For example, nanoparticles are used as bio-imaging tags in dark field microscopy techniques, where the scattering from individual nanoparticles with diameters larger than 40 nm-50 nm can be observed. On the other hand, from the viewpoint that larger size benefits reflection, the diameter of the metal particles is preferably as large as possible. Thus, the size of the metal particles is preferably balanced.

When the wavelength of 850 nm is targeted, the metal particles preferably include gold particles, silver particles or combination thereof since gold and silver mirror coatings generally show good reflectance at the wavelength in comparison with other metal, and such particles are easily available with various sizes. In a further preferable embodiment, the metal particles include gold particles since the larger nanoparticle size benefits reflection and the gold nanoparticles perform much lower optical density when the size is larger range (~200 nm) in comparison with silver nanoparticle.

The metal particle can be a bare metal sphere, a molecular capped metal sphere, a polymer shell coated metal sphere, or mixture thereof. For example, uniform bare Au spheres are available, generally in a form of a suspension in a liquid (aqueous) to prevent particle aggregation. Also, uniform bare Au spheres are available in a form of freeze dry (non-aqueous) nanoparticles. The freeze dry nanoparticles have advantages that they can be stored for several years, can be re-suspended in a variety of different solvents, can be prepared at a very high concentration, and have a consistent free-ion concentration once re-suspended. Au nanoparticles are available with various sizes (e.g., 5-400 nm) with coefficient of variation less than 10%.

Also, polystyrene-coated nanoparticles dispersed in appropriate solvent are available and can easily be transferred to other compatible solvents. The polystyrene-coated nanoparticles having various sizes (e.g., 10-100 nm) are available with coefficient of variation of less than 15%. By using the polystyrene-coated nanoparticles, self-assembled structures can also be contemplated. However, in some embodiments, such a self-assembled structure may not be needed, thus avoiding additional process costs. Furthermore, thiol capped Au nanoparticles are available.

In a particular embodiment, the metal particle film can include adhesive material that fixes the metal particles to the cavity side surface 40a. Such adhesive material can include underfills and sidefill materials, which are used in the field of optical modules, and ultraviolet curable resins, thermosetting resins and other adhesive material. In one or more embodiments, the adhesive material having low viscosity in a range of less than 100 Pa·s is preferably used the perspective of the production quality of the metal particle film 50.

The metal particle film may cover the cavity side surface 40a, 40c and at least a part of the bottom surface 40b of the cavity 40. In order to coat the metal particle on the cavity side surface 40a, the mixture of liquid adhesive material and dispersed metal particles is applied into the cavity 40 of the polymer waveguide layer 30. Application of the mixture can be performed by using a super fine nozzle. The metal particle film can be spread over the cavity side surface 40a by applying appropriate centrifugal force using a spin coater, for example. In the particular embodiment where the metal particle film 50 is made by applying the centrifugal force, the distribution of the mixture, accordingly, the metal particle film 50 can be configured to be biased towards the side of the cavity side surface 40a that works as the reflective surface of the light. In a particular embodiment, average thickness of the metal particle film 50 is few micrometers.

Hereinafter, referring to a series of FIGS. 3A-3D and FIGS. 4A and 4B, a process for fabricating an embedded mirror structure according to an exemplary embodiment of the present invention will be described. FIGS. 3A, 3B, 3C, 3D illustrate schematics of structures obtained at steps of the fabrication process of the embedded mirror structure. FIGS. 4A and 4B also illustrate cross-sectional views of structures obtained during the fabrication process of the embedded mirror structure.

At the beginning of the fabrication process of the embedded mirror structure, a structure 60 including an organic substrate 20 and a polymer waveguide layer 30 is prepared. The polymer waveguide layer 30 includes cores 34 and cavities 40 opened at the top surface 30a and aligned to the cores 34 similarly as described with reference to FIGS. 2A and 2B. The difference from FIGS. 2A and 2B is that there is no metal particle film yet. When a structure without cavities is purchased from a vender, the cavities are formed into the structure prior to this fabrication process. The cavity can be fabricated by laser ablation.

Figure 3A:
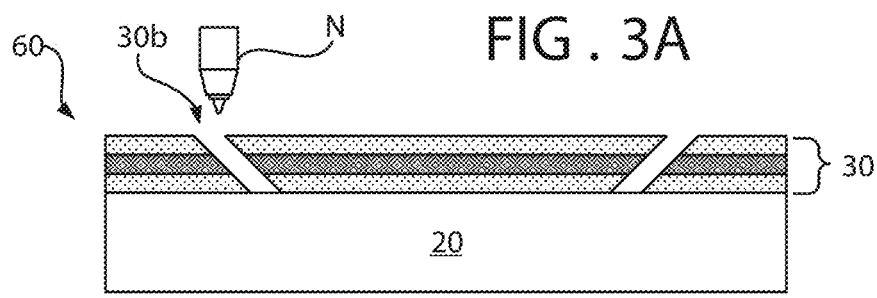
FIGS. 3A, 3B, 3C and 3D illustrate schematics of a structure obtained in each step of a fabrication process of an embedded mirror structure according to an exemplary embodiment of the present invention.
Figure 4A:
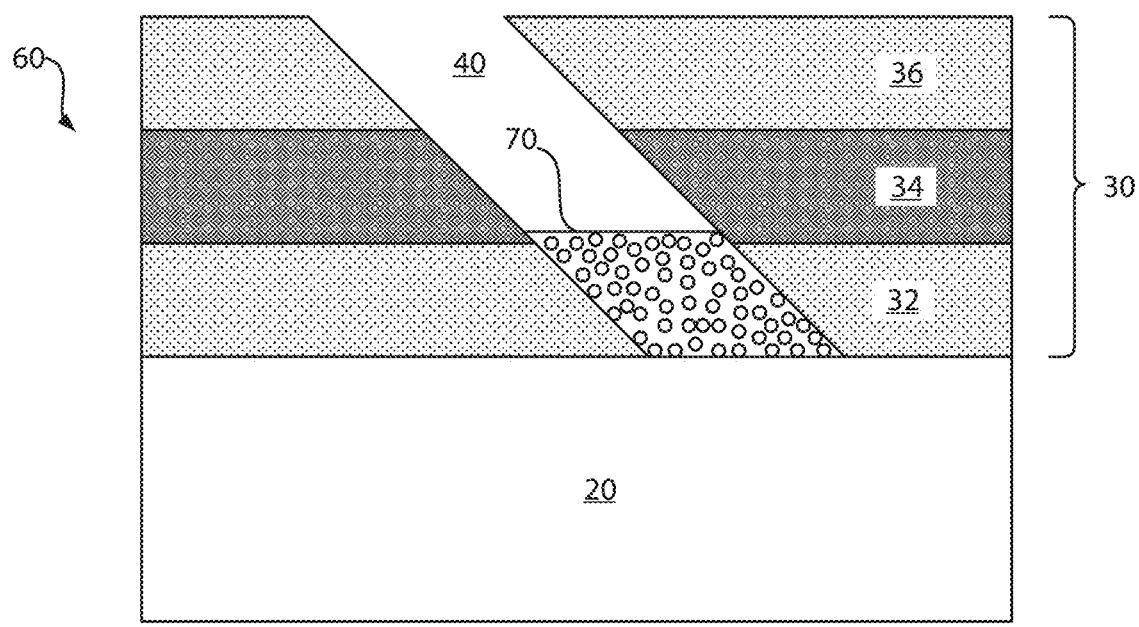
FIGS. 4A and 4B illustrate cross-sectional views of structures obtained in steps of the fabrication process of the embedded mirror structure according to the exemplary embodiment of the present invention.
Figure 4B:
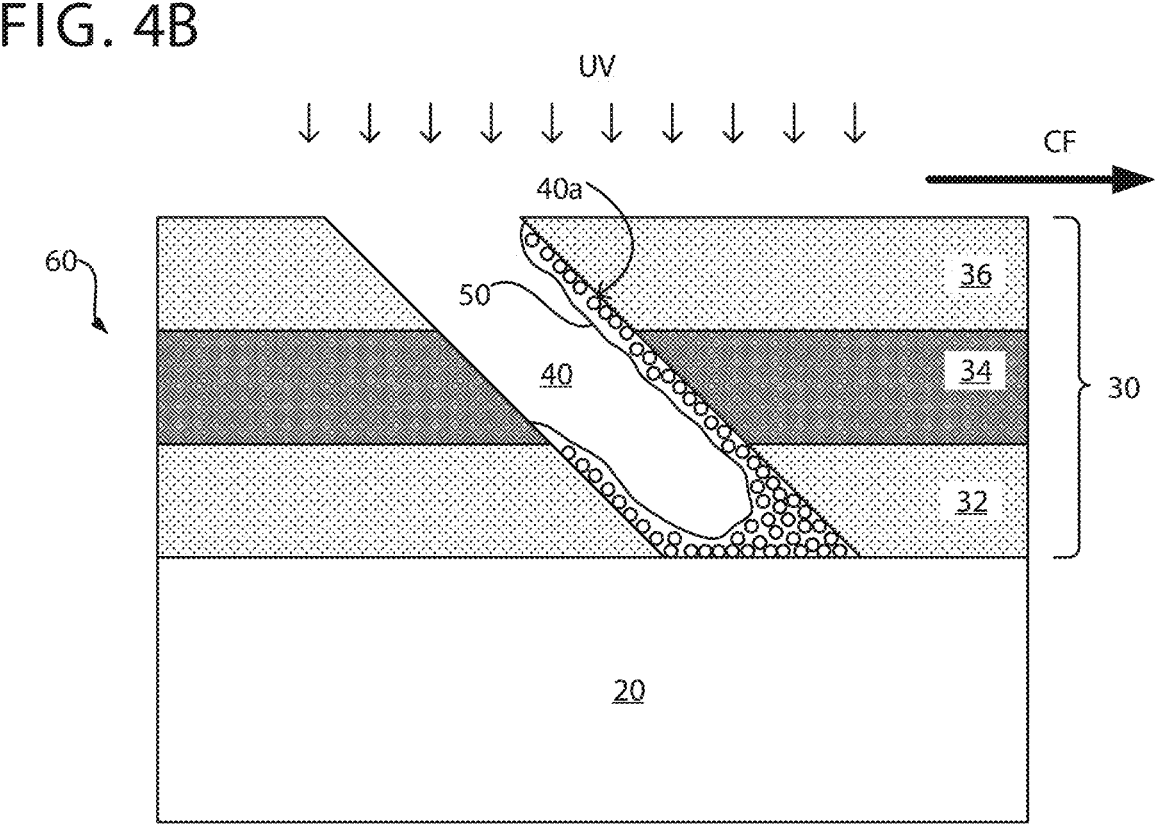

With reference to FIG. 3A and FIG. 4A, the fabrication process can include a step of dispensing a mixture 70 of liquid adhesive material and dispersed metal particles (as shown in FIG. 4A) into the cavity 40 of the polymer waveguide layer 30, in a form of a droplet, through the opening 30b. In a particular embodiment, a mixture of low viscosity liquid adhesive (<100 Pa·s) and a large amount of non-aqueous gold or silver nanoparticles can be used. The concentration of the nanoparticles is not limited to a specific range, but it is preferably as high as possible. The freeze dry nanoparticles are preferably used to prepare the mixture 70 since the mixture 70 can be prepared at a very high concentration. In a particular embodiment, to dispense the mixture 70 into the cavity 40 with small volume space, a super-fine nozzle N with an inner diameter of 0.02 mm to ~0.6 mm can be used. The dimensions of the super-fine nozzle N can be selected according to the dimensions of the cavity 40. Also, dispensing of the mixture 70 into a plurality of cavities 40 can be performed at the step. However, due to characteristic of the subsequent steps, the processing for the plurality of the cavities 40 at one side of the channels can be done at once, but the processing for other side of the channels would be done in a later step.

Figure 3B:
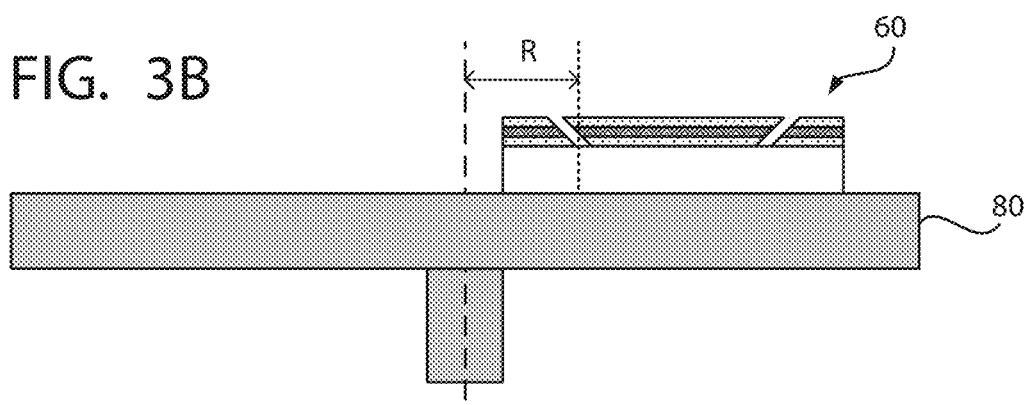

With reference to FIG. 3B, the fabrication process can include a step of arranging the structure 60 on a stage 80 of a spin coater, for example. The structure 60 is arranged on the stage 80 so that the cavity side surface 40a (as shown in FIG. 4B) to be coated faces approximately the center side of the rotations with a predetermined distance R (e.g., 5 mm) away from the center of rotation.

Figure 3C:
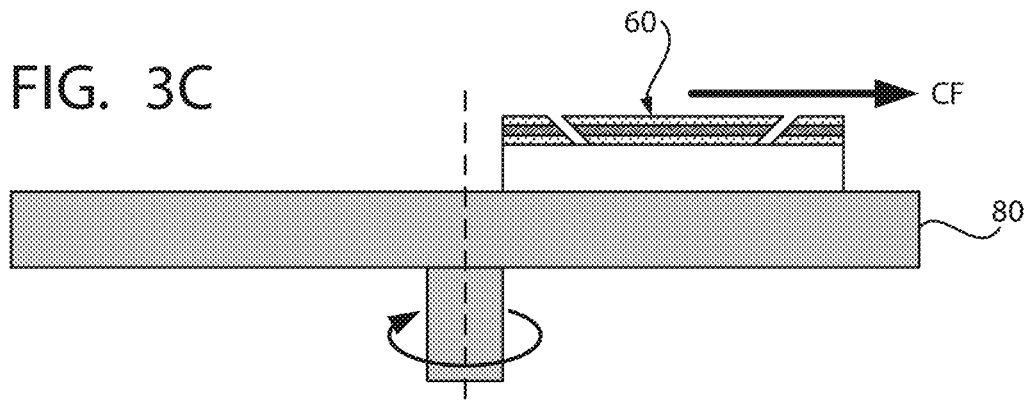

With reference to FIG. 3C, the fabrication process can include a step of starting rotation of the spin coater to push the mixture 70 against the cavity side surface 40a with centrifugal force CF generated by the rotation of the stage 80. Although the cavity side surface 40a is inclined with a slope angle exceeding perpendicular with respect to a horizontal plane G, a liquid surface of the mixture 70 is rising on the outer side during the rotation. In a particular embodiment, the speed of the rotation can range from 5,000 to 15,000 rpm, however, it can depend on the distance R from the center of rotation.

During the high speed rotation, the nanoparticles would not be moved by centripetal force inside the adhesive material since the centripetal force ($F_C$) of the single particle, that is estimated to be $2.22 \times 10^{-9}$ kg/ms$^2$ in one estimation, is much smaller than the viscous drag force ($F_V$) on the single particle, that is estimated to be $2.96 \times 10^{-4}$ kg/ms$^2$ in one estimation, thus $F_V \gg F_C$, when considering the following process parameters: {particle radius(r)=50 nm; density of the metal (d)=19.3 g/cm$^3$ in the case of Au; rotation speed (v)=10,000 rpm, mirror to center distance (R)=5 mm; viscosity of adhesive (h)=60 Pa·s}. Thus, the distribution of the nanoparticle in the film is expected to be uniform. However, less viscous adhesive material is can be advantageously utilized as well.

Figure 3D:
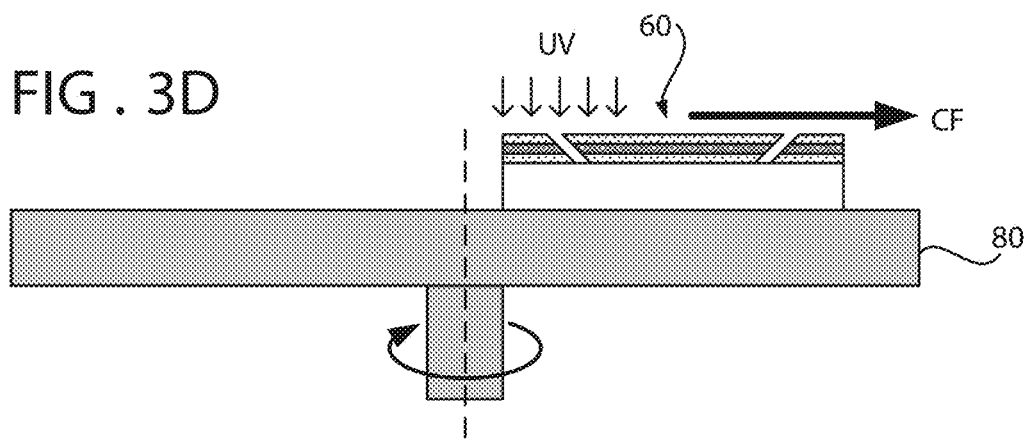

With reference to FIG. 3D and FIG. 4B, the fabrication process can include a step of curing the mixture 70 that adheres to the cavity side surface 40a during the rotations by UV irradiation. The cured metal particle film 50 includes the adhesive material fixing the metal particles to the cavity side surface 40a, and covers the cavity side surface 40a, 40b and at least a part of the bottom surface 40b of the cavity 40. When the illumination area of the UV light is large enough, the mixture 70 dispensed into the cavity 40 is expected to be cured uniformly during the rotations and irradiation. The duration of the rotation and the curing can range from 30 minutes to several hours.

The average thickness of the cured metal particle film 50 can be several micrometers. In one estimation, the average thickness is estimated to be 3.37 µm (micrometer) according to the spin coating theory that incorporates nanoparticle movement by adhesive distribution when considering the following process parameters: {time of process=3,600 s; density of the adhesive=1.0 g/cm$^3$; rotation speed (v)=10,000 rpm; viscosity of adhesive (h)=60 Pa·s}.

According to the fabrication processes shown in the series of FIGS. 3A to 3D and FIGS. 4A and 4B, the metal particles are coated on the cavity side surface 40a inside the cavity 40 of the polymer waveguide layer 30 to form the metal particle film 50. The distribution of the mixture, accordingly, the metal particle film 50 can be biased towards the side of the cavity side surface 40a that works as the reflective surface of the light since the structure 60 is placed so that the cavity side surface 40a faces approximately the center of the rotations.

As described above, after the processing for one side of the channels is completed, processing for other side of the channels can be performed subsequently. That is, the same procedure is repeated again. The dispensing is performed for the other side and the structure 60 is reoriented on the stage 80 so that an opposite cavity side surface faces approximately the center side of the rotations at a predetermined distance R away from the center of the rotation. And the rotating and the curing are performed again.

Figure 5A:
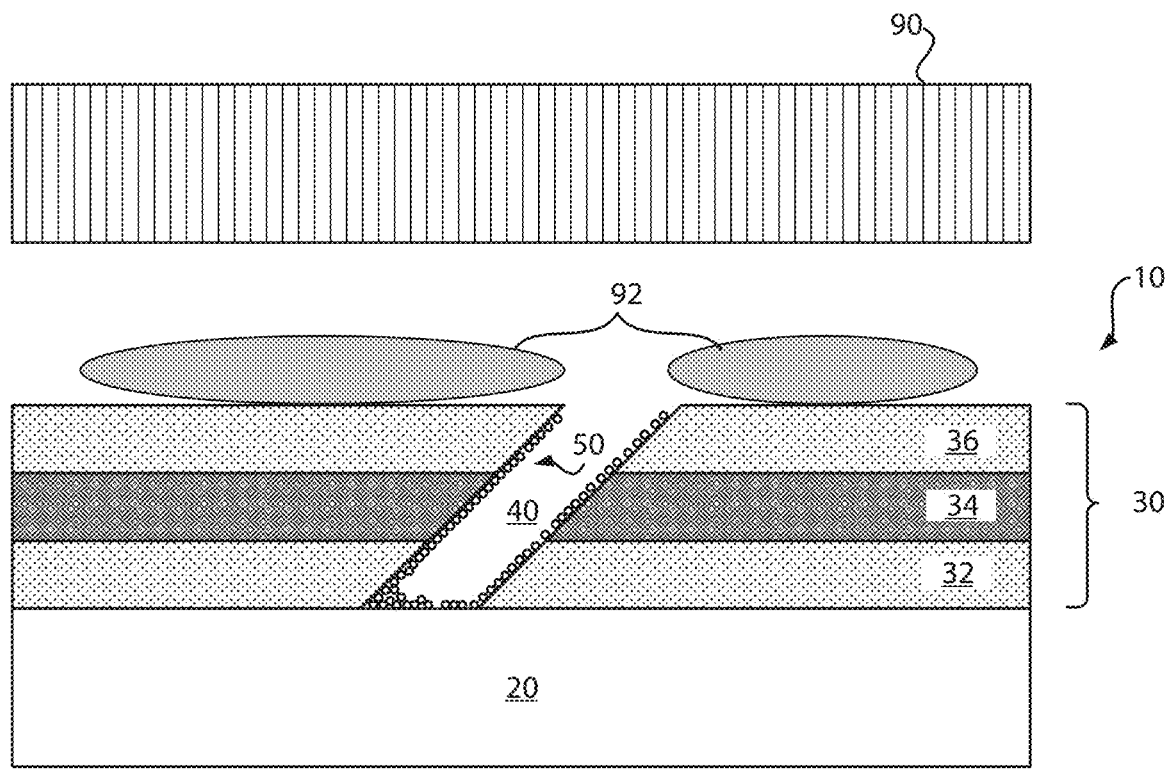
FIGS. 5A and 5B illustrate enlarged cross-sectional views of optical interconnection structures obtained during a fabrication process of a device according to an exemplary embodiment of the present invention.
Figure 5B:
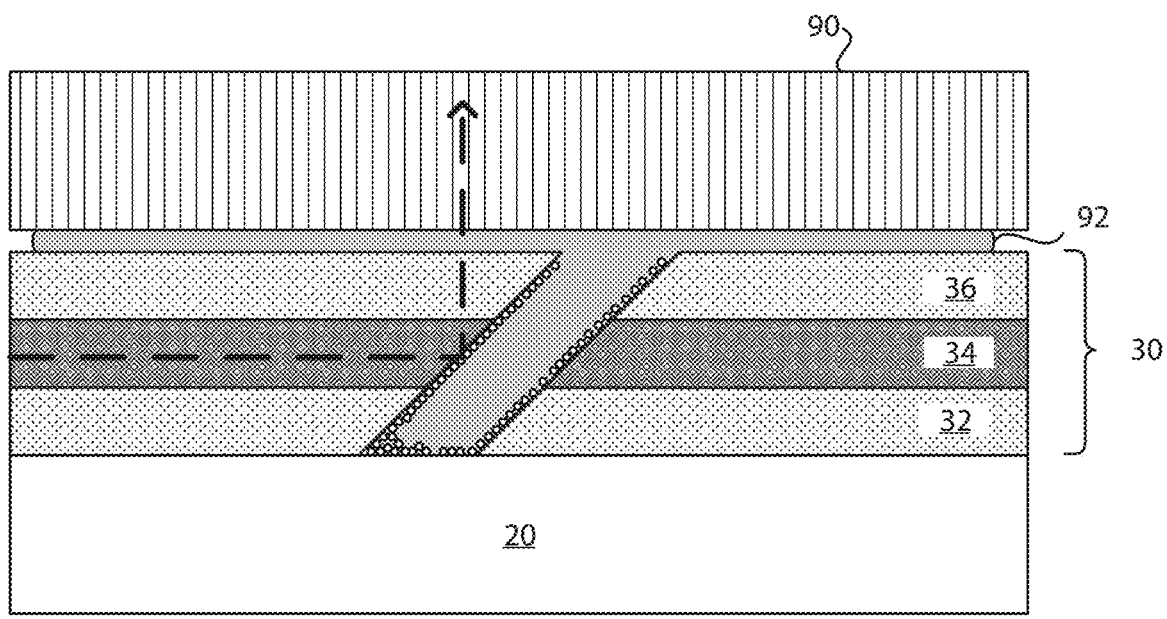

With reference to FIGS. 5A and 5B, a fabrication process of a device including an embedded mirror structure and optical interconnection structures obtained during the fabrication process according to an exemplary embodiment of the present invention will be described. FIGS. 5A and 5B illustrate enlarged cross-sectional views of optical interconnection structures obtained during the fabrication process.

At the beginning of the fabrication process of the device, an embedded mirror structure 10 including an organic substrate 20 and a polymer waveguide layer 30 on the organic substrate 20 is prepared. The polymer waveguide layer 30 includes a core 34 and a cavity 40 opened at the top surface 30a (shown in FIG. 2A) and aligned to the core 34. The prepared embedded mirror structure 10 includes a metal particle film 50 formed on the cavity side surface 40a. When an embedded mirror structure with no metal particle film is purchased from a vender, the fabrication process of the embedded mirror structure shown in FIGS. 3A to 3D is performed prior to this device fabrication process.

With reference to FIG. 5A, the fabrication process of the device can include applying resin material (underfill) 92 on the polymer waveguide layer 30. Further the fabrication process of the device can include mounting an optical or optoelectronic component 90 onto the embedded mirror structure 10 so that the optical or optoelectronic component 90 is optically coupled to the polymer waveguide layer 30.

With reference to FIG. 5B, the resin material 92 applied to the polymer waveguide layer 30 adheres to the optical or optoelectronic component 90 at a bottom surface and fill a gap between the optical or optoelectronic component 90 and the polymer waveguide layer 30. Also the resin material 92 may penetrate into the cavity 40 of the polymer waveguide layer 30 at least in part. After appropriate curing process, the resin material 92 fixes the mounted component 90 to the polymer waveguide layer 30.

The existence of the resin material 92 penetrating into the cavity 40 reduces the difference in refractive indices between the medium of the cavity 40 (that is now more resin material rather than air) and the core 34 such that the TIR conditions are not satisfied at the interface any more. However, in the interconnection shown in FIG. 5B, even though the resin material 92 that has a refractive index similar to the polymer waveguide layer 30 penetrates into the cavity 40, reflection loss at the interface can be minimized due to the existence of the metal particles. The metal particles formed at the interface provide metallic reflection. Of course, when the resin material 92 does not cover the cavity side surface 40a, the TIR conditions can be still satisfied so that the interface provides good reflectance due to total internal reflection phenomenon.

Furthermore, since the resin material 92 also fills the gap between the optical or optoelectronic component 90 and the polymer waveguide layer 30 where optical signals pass through, the optical loss due to reflections at interfaces between the polymer waveguide layer 30, the resin material 92 and the optical or optoelectronic component 90 can be minimized.

Figure 6A:
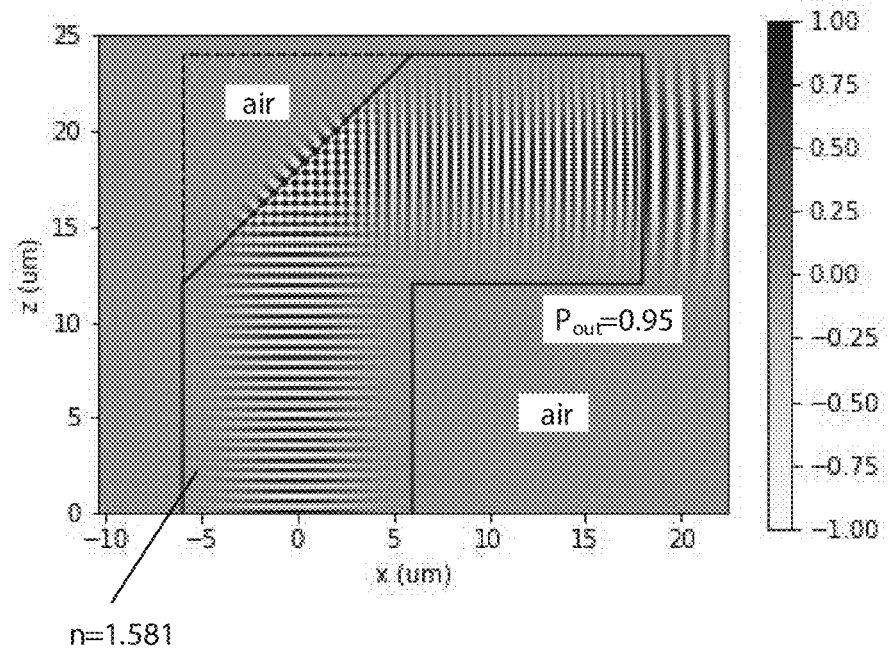
FIGS. 6A and 6B shows results of optical FDTD (Finite-Difference Time-Domain) analysis of a structure modelling a normal TIR structure.
Figure 6B:
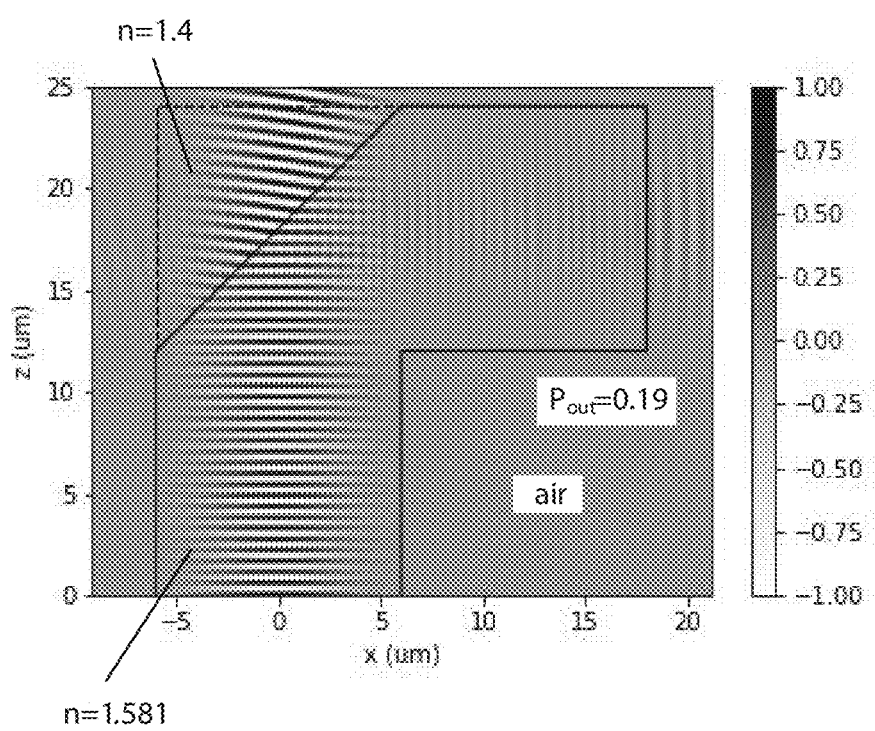

With reference to FIGS. 6A and 6B and FIGS. 7A and 7B, results of optical FDTD (Finite-Difference Time-Domain) analysis will be described. The optical FDTD algorithm solves electromagnetic fields in spatial and temporal domains when a model structure is given FIGS. 6A and 6B show simulation results of a waveguide structure without a metal particle film. In this simulation, the refractive index of the waveguide is set to 1.581, air is assumed to be the ambient medium and the refractive index of the resin material is set to 1.4. FIG. 6A corresponds to a case where the cavity is not filled with the resin material. As shown in FIG. 6A, the waveguide structure redirects the incoming wave in a perpendicular direction. Total internal reflection phenomena take place at the diagonal interface. On the other hand, FIG. 6B corresponds to a case where the cavity is filled with the resin material, which imitates the penetration of the underfill material during interconnect formation. The waveguide structure hardly redirects the incoming wave. Most of the incoming wave propagates straight since TIR conditions are not satisfied at the diagonal interface.

Figure 7A:
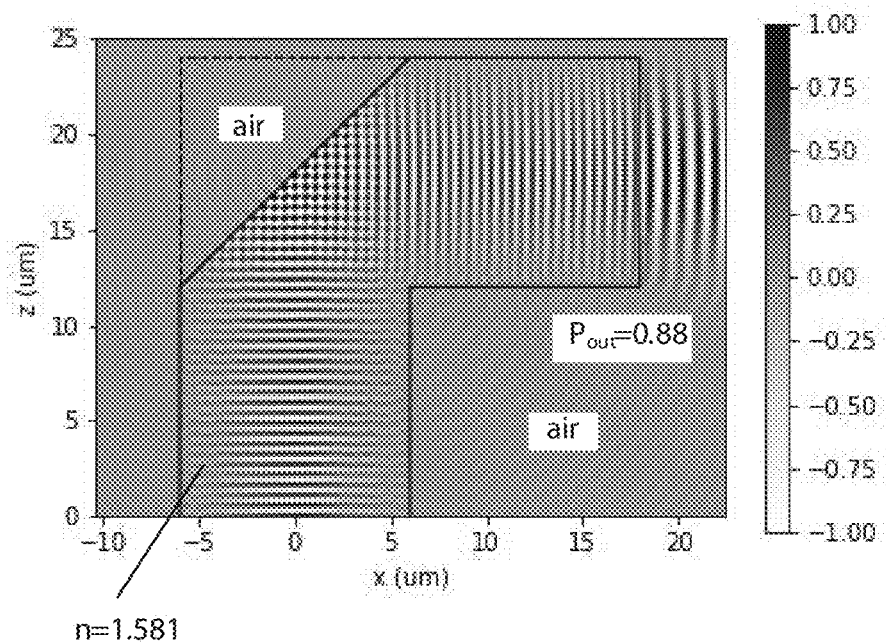
FIGS. 7A and 7B shows results of FDTD analysis of a structure modelling the embedded mirror structure according to the exemplary embodiment of the present invention.
Figure 7B:
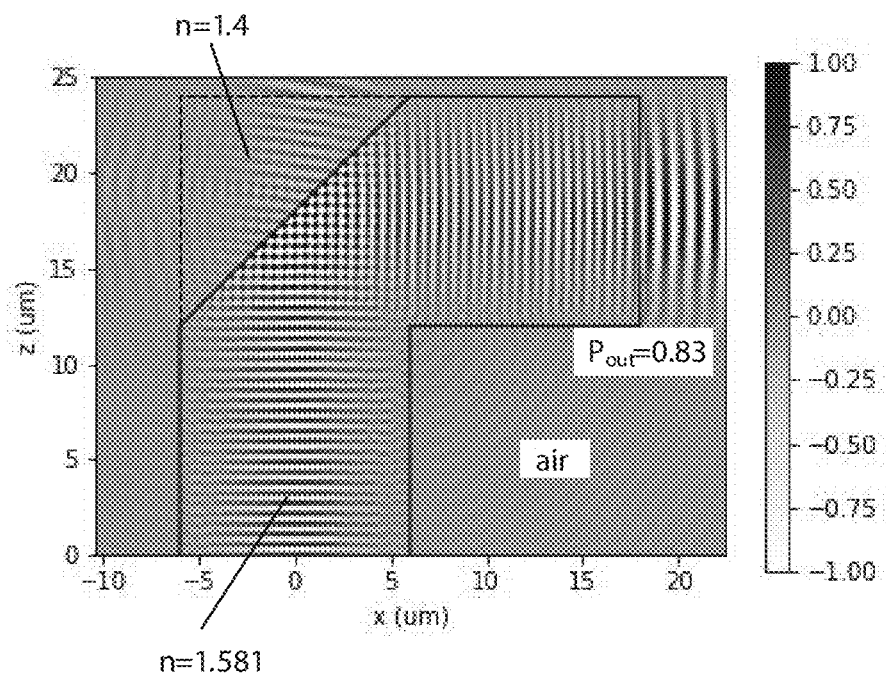
Figure 8A:
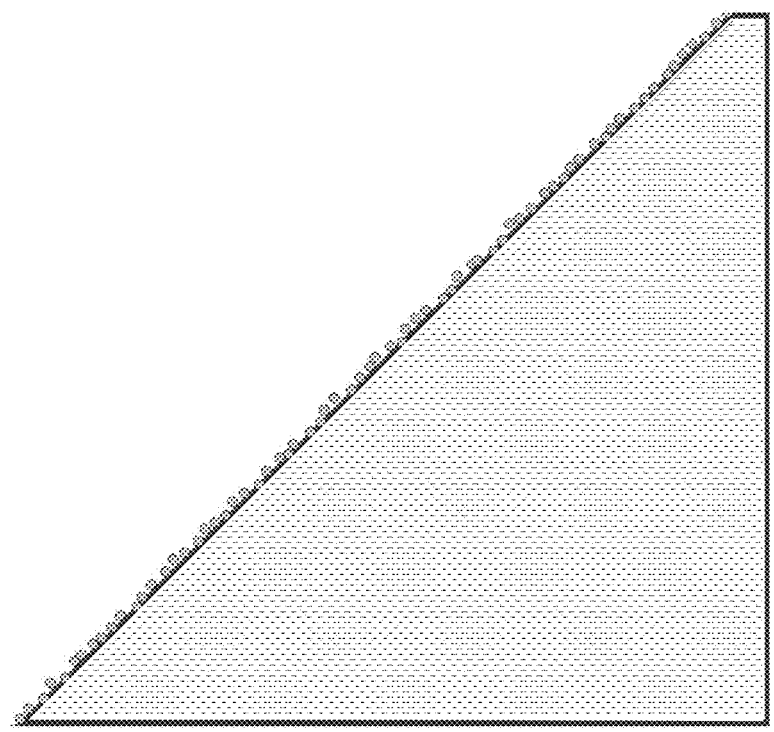
FIG. 8A shows a layout for the simulation of the waveguide structure with the metal particle film formed on a mirror surface.

FIGS. 7A and 7B show simulation results of a waveguide structure with a metal particle film. FIG. 8A shows a layout for the simulation of the waveguide structure with the metal particle film formed on a mirror surface. In the layout, Au or Ag nanoparticles with 60 nm diameter are distributed on the mirror surface randomly. Note that in this layout, the Au or Ag nanoparticles are shown to form a single particle layer. However, the Au or Ag nanoparticles can be formed in a multiple particle layer. The layout is the same for the Au nanoparticles and the Ag nanoparticles except for material parameters. The waveguide structure shown in FIG. 7A simulates the embedded mirror structure according to the exemplary embodiment of the present invention. In the simulation of FIGS. 7A and 7B, the coating of the Au nanoparticles with 60 nm diameter is assumed.

FIG. 7A corresponds to a case where the cavity is not filled with resin material. As shown in FIG. 7A, the waveguide structure redirects the incoming wave in a perpendicular direction as similar to the case shown in FIG. 6A. Total internal reflection and/or metallic reflection take place at the diagonal interface.

FIG. 7B corresponds to a case where the cavity is filled with the resin material. Unlike the case shown in FIG. 6B in which the wave travels through the waveguide structure, the waveguide structure of FIG. 7B redirects the incoming wave in a perpendicular direction with only a slight intensity drop as compared to FIG. 7A. Even though TIR conditions may not be satisfied at the diagonal interface, however, the metallic reflection takes place at the diagonal interface.

Figure 8B:
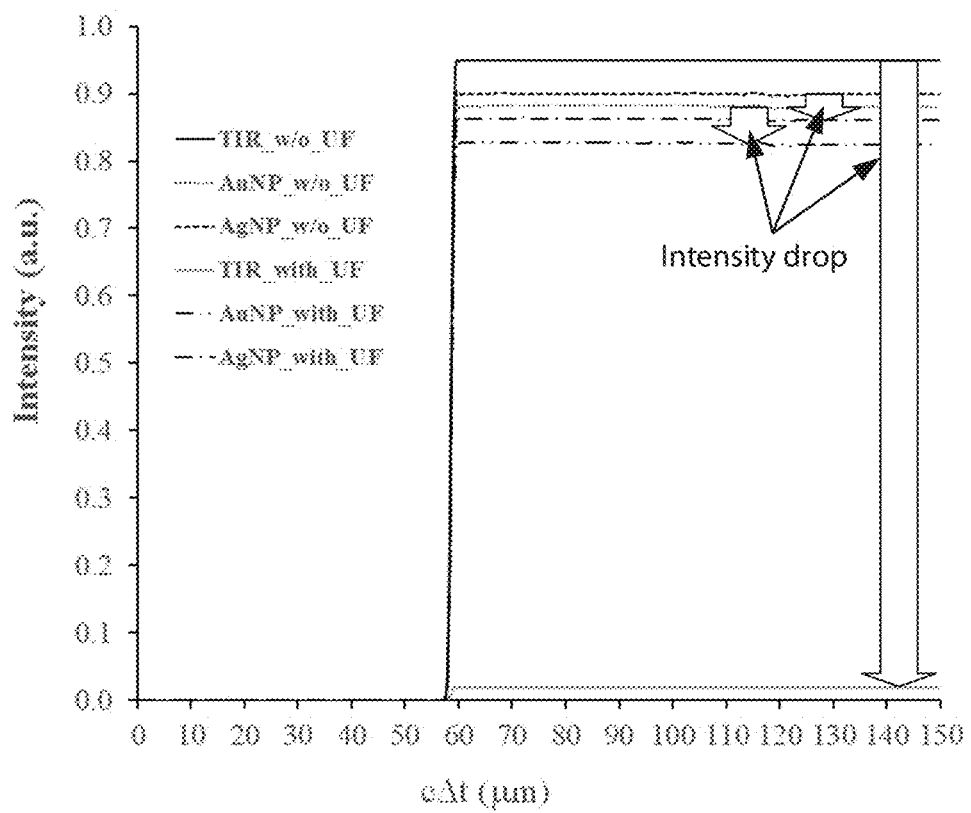
FIG. 8B shows a simulation result of transition of beam intensity in a structure with and without the metal particle film according to the exemplary embodiment of the present invention.

FIG. 8B shows a simulation result of transition of beam intensity in a structure with and without the metal particle film according to the exemplary embodiment of the present invention. Note that the horizontal axis corresponds to time, and a range where intensity is zero means that the light has not arrived yet.

As shown in FIG. 8B, TIR mirror without the metal particle film shows the highest intensity when there is no resin material in the cavity (TIR_w/o_UF). However, once the resin material flows into the cavity, the intensity drops dramatically (a comparison between TIR_w_UF and TIR_w/o_UF). The TIR mirrors with the metal particle films show slightly lower intensity than the uncovered TIR mirror without the metal particle film (AuNP_w/o_UF and AgNP_w/o_UF in comparison with TIR_w/o_UF). However, even once the resin material penetrates into the cavity, the intensity drops only slightly (from the highest intensity provided by TIR_w/o_UF) in comparison with the TIR mirror without the metal particle film (AuNP_w_UF and AgNP_w_UF in comparison with TIR_w_UF). The TIR mirrors with the metal particle films show good intensity as a whole regardless of whether the resin material penetrates into the cavity or not.

Figure 9A:
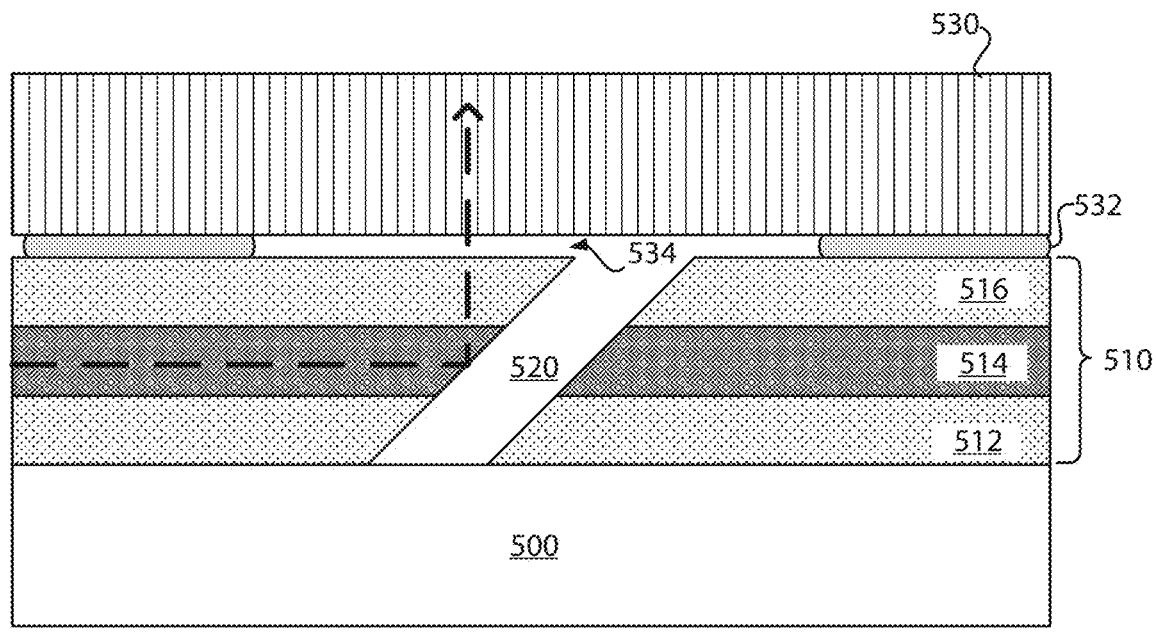
FIGS. 9A and 9B illustrates enlarged cross-sectional views of related optical interconnection structures between waveguide layers and components mounted thereof.

FIG. 9A illustrates an enlarged cross-sectional view of a related optical interconnection structure between a waveguide layer and a component mounted thereof. In the related optical interconnection structure shown in FIG. 9A, an embedded mirror structure including an organic substrate 500 and a polymer waveguide layer 510 is prepared. The polymer waveguide layer 510 includes a core 514 sandwiched between upper and lower cladding layers 516, 512 and a cavity 520 fabricated obliquely from a top to a bottom of the polymer waveguide layer 510 as similar to the embedded mirror structure 10 shown in FIGS. 2A and 2B. However, the embedded mirror structure of FIG. 9A does not have any metal particle film.

In such optical interconnection structure, it is necessary to apply resin material 532 on the top of the polymer waveguide layer 510 while avoiding an area around the cavity 520 in order to prevent the resin material 532 from penetrating into the cavity 520. Hence, in this case, it is difficult to fill, with the resin material 532, a gap 534 between the polymer waveguide layer 510 and a component 530 mounted thereon.

Since an air gap 534 between the component 530 and the polymer waveguide layer 510 is inevitable, the optical loss due to reflections at interfaces between the polymer waveguide layer 510, the resin material 532 and the component 530 is also inevitable.

Figure 9B:
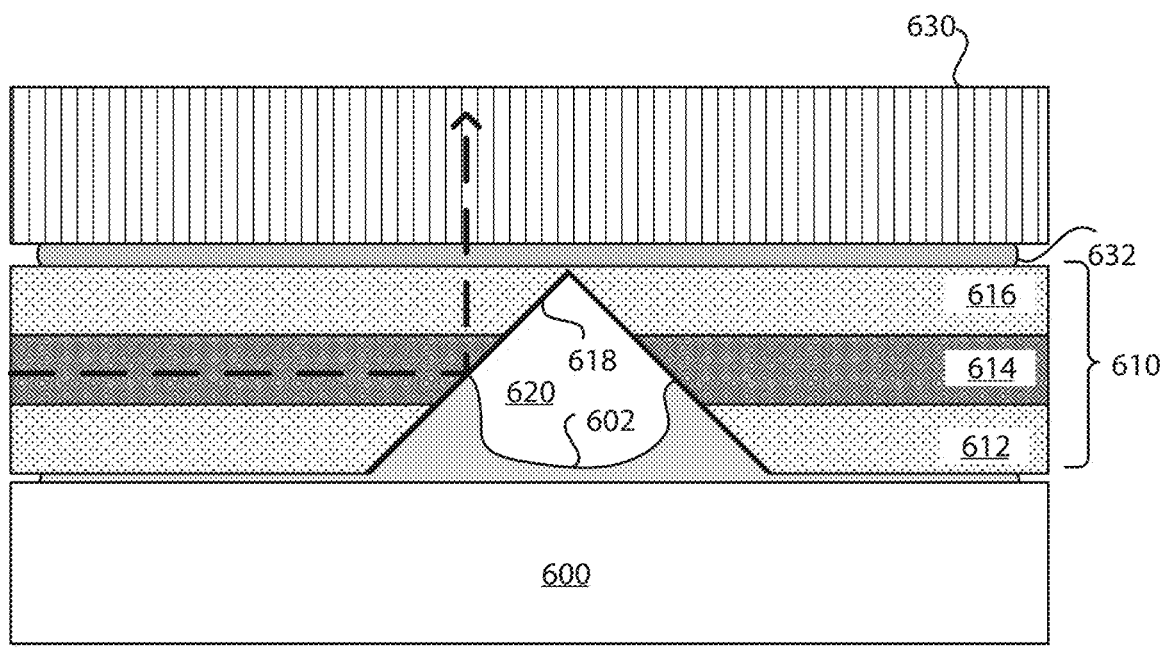

FIG. 9B illustrates an enlarged cross-sectional view of other related optical interconnection structure between a waveguide layer and a component mounted thereof. In the related optical interconnection structure shown in FIG. 9B, an embedded mirror structure including an organic substrate 600 and a polymer waveguide layer 610 is prepared. The polymer waveguide layer 610 includes a core 614 sandwiched between upper cladding layer 616 and lower cladding layer 612. In this structure, a V-shaped groove is fabricated in the polymer waveguide layer 610 using a diamond blade dicer before laying the polymer waveguide layer 610 on the organic substrate 600. The surface of the V-shaped groove can be coated by a silver layer 618. The polymer waveguide layer 610 having the V-shaped groove is then turned over and laminated on the organic substrate 600 with resin material 602, which would also penetrate into the V-shaped groove 620 between the polymer waveguide layer 610 and the organic substrate 600.

The component 630 is mounted on the structure after applying resin material 632 on the polymer waveguide layer 610. The resin material 632 adheres to the component 630 at the bottom surface and fills a gap between the component 630 and the polymer waveguide layer 610. However, since the V-shaped groove are fabricated in the polymer waveguide layer 610 using the diamond blade dicer, one V-shaped groove is required to be fabricated for all the channels at once, making high density fabrication of optical channels difficult. Also, the mirror is required to be fabricated before laying the polymer waveguide layer 610 on the organic substrate 600, leading to a more stringent requirement for positioning alignment between the mirror of the polymer waveguide layer and a mask for forming the silver coating. Furthermore, since the V-shaped groove is fabricated by the diamond blade dicer, it is hard to make the surface roughness of the interface finer.

In contrast to the related structure, the mirror embedded structure according to one or more embodiments of the invention can be fabricated efficiently with higher accuracy and lower risk of malfunction during subsequent formation of an optical interconnect. The metal material provided to the interface can compensate for a loss of total internal reflection at the interface when a foreign material gets into the interface. The metal material works as a backup for the TIR mirror.

In the particular embodiment, the TIR mechanism can be protected once a liquid adhesive material with metal particles is introduced into the cavity. There is no concern with dispensing resin material when bonding components such as optoelectronic chips and lens connectors to the waveguide layer. Optical loss during light propagation between the polymer waveguide layer and the mounted components can be reduced. Surface roughness of the interface can be improved by using the laser ablation as a processing tool. Mechanical robustness of the components bonded on the waveguide surface can also be improved.

Furthermore, according to the method of the described embodiments of the invention, the mirror embedded structure can be fabricated at a lower cost than a standard deposition method such as sputtering.

Having described the advantages obtained with respect to the one or more specific embodiments according to the present invention, it should be understood that some embodiments may not have these potential advantages and these potential advantages are not necessarily required of all embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, steps, layers, elements, and/or components, but do not preclude the presence or addition of one or more other features, steps, layers, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for forming an embedded mirror structure, comprising:
   preparing a structure comprising a substrate and a waveguide layer on the substrate, the waveguide layer including a core, the waveguide layer having a top surface and a cavity side surface defining a cavity opened at the top surface and aligned to the core; and
   coating metal particles on the cavity side surface inside the cavity of the waveguide layer using centrifugal force to form a metal particle film on the cavity side surface.

2. The method of claim 1, wherein coating comprises:
   dispensing a mixture of adhesive material and dispersed metal particles therein into the cavity of the waveguide layer;
   pushing the mixture against the cavity side surface with centrifugal force; and
   curing the mixture adhering to the cavity side surface.

3. The method of claim 2, wherein the centrifugal force is generated by rotation of a stage carrying the structure, wherein the substrate is arranged on the stage so that the cavity side surface to be coated faces a center side of the rotation.

4. The method of claim 1, wherein the cavity side surface is inclined with a slope angle exceeding perpendicular with respect to a horizontal plane parallel to the top surface.

5. The method of claim 1, wherein the metal particles are selected from the group consisting of gold particles, silver particles and combination thereof.

6. The method of claim 1, wherein the metal particles have a diameter in a range of less than 100 nanometers.

7. A fabrication method for fabricating a device, comprising:
   performing the method of claim 1;
   mounting an optical or optoelectronic component onto the structure so that the optical or optoelectronic component is optically coupled to the waveguide layer of the structure.

8. The fabrication method of claim 7, wherein the fabrication method further comprises:
   applying resin material on the waveguide layer, the resin material adhering to the optical or optoelectronic component at a bottom surface thereof, filling a gap between the optical or optoelectronic component and the waveguide layer and penetrating into the cavity of the waveguide layer at least in part.

9. An embedded mirror structure, comprising:
   a substrate;
   a waveguide layer on the substrate, the waveguide layer including a core and having a top surface and a cavity side surface defining a cavity opened at the top surface and aligned to the core; and
   a metal particle film formed on the cavity side surface of the waveguide layer using centrifugal force, the metal particle film comprising metal particles coated on the cavity side surface.

10. The embedded mirror structure of claim 9, wherein the metal particle film is formed by:
    dispensing a mixture of adhesive material and dispersed metal particles therein into the cavity of the waveguide layer;
    pushing the mixture against the cavity side surface with centrifugal force; and
    curing the mixture adhering to the cavity side surface.

11. The embedded mirror structure of claim 9, wherein the cavity side surface is inclined with a slope angle exceeding perpendicular with respect to a horizontal plane parallel to the top surface.

12. The embedded mirror structure of claim 9, wherein the metal particle film includes adhesive material fixing the metal particles to the cavity side surface, the metal particle film covering the cavity side surface and at least a part of a bottom of the cavity.

13. The embedded mirror structure of claim 9, wherein the metal particles is selected from the group consisting of gold particles, silver particles and combination thereof.

14. The embedded mirror structure of claim 13, wherein the metal particles have a diameter in a range of less than 100 nanometers.

15. The embedded mirror structure of claim 9, wherein the embedded mirror structure further comprises:
    an optical or optoelectronic component mounted on the waveguide layer;
    resin material fixing the optical or optoelectronic component to the waveguide layer, the resin material filling a gap between the optical or optoelectronic component and the waveguide layer and penetrating into the cavity of the waveguide layer at least in part.

16. The embedded mirror structure of claim 9, wherein the substrate is an organic substrate and the waveguide layer is a polymer waveguide layer and the core is a polymer core.

17. A device comprising:
    the embedded mirror structure of claim 9; and
    an optical or optoelectronic component optically coupled to the waveguide layer of the embedded mirror structure.

18. A waveguide integrated board comprising:
    the embedded mirror structure of claim 9, wherein the core includes a plurality of cores and the cavity side surface includes a plurality of cavity side surfaces defining respective cavities opened at the top surface and aligned to the plurality of the cores, respectively, and the metal particle film includes a plurality of the metal particle films formed on the cavity side surfaces, respectively.

19. A fabrication method for fabricating a device, comprising;
    preparing an embedded mirror structure comprising:
        a substrate,
        a waveguide layer on the substrate, the waveguide layer including a core and having a top surface and a cavity side surface defining a cavity opened at the top surface and aligned to the core; and a metal particle film formed on the cavity side surface of the waveguide layer by centrifugal force, the metal particle film comprising metal particles coated on the cavity side surface; and mounting an optical or optoelectronic component onto the embedded mirror structure so that the optical or optoelectronic component is optically coupled to the waveguide layer of the embedded mirror structure.

20. The fabrication method of claim 19, wherein the fabrication method further comprises:

applying a resin material on the waveguide layer, the resin material adhering to the optical or optoelectronic component at a bottom surface, filling a gap between the optical or optoelectronic component and the waveguide layer and penetrating into the cavity of the waveguide layer at least in part.

* * * * *